United States Patent
Miller et al.

(10) Patent No.: US 9,282,219 B2
(45) Date of Patent: Mar. 8, 2016

(54) AUTOMATIC GENERATION OF PRINT DATA FOR PRINT JOBS BASED ON AVAILABLE MEDIA ATTRIBUTES

(75) Inventors: Howard A. Miller, Saratoga, CA (US); Richard Blanchard, Sonoma, CA (US); Todd W. Ritland, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 13/310,220

(22) Filed: Dec. 2, 2011

(65) Prior Publication Data

US 2012/0307268 A1    Dec. 6, 2012

Related U.S. Application Data

(60) Provisional application No. 61/493,500, filed on Jun. 5, 2011.

(51) Int. Cl.
*H04N 1/60* (2006.01)
*G06K 15/02* (2006.01)
*H04N 1/56* (2006.01)
*H04N 1/46* (2006.01)

(52) U.S. Cl.
CPC ... *H04N 1/56* (2013.01); *H04N 1/46* (2013.01)

(58) Field of Classification Search
USPC .......... 358/1.1, 1.2, 1.9, 1.13, 1.15, 1.18, 2.1, 358/448, 452; 710/15, 19; 399/8, 75, 81; 455/557
See application file for complete search history.

(56) References Cited

U.S. PATENT DOCUMENTS

| | | | |
|---|---|---|---|
| 6,621,589 B1 * | 9/2003 | Al-Kazily et al. ........... 358/1.15 |
| 6,731,396 B1 * | 5/2004 | Buis ...................... G06F 3/1205 |
| | | | 358/1.12 |
| 6,876,464 B1 * | 4/2005 | Shima ......................... 358/1.16 |
| 6,922,725 B2 * | 7/2005 | Lamming et al. ............. 709/227 |
| 7,385,721 B2 * | 6/2008 | Shahindoust ................ 358/1.15 |
| 7,853,693 B2 | 12/2010 | Abraham et al. |
| 8,285,210 B2 * | 10/2012 | Oshima et al. ................ 455/566 |
| 8,572,304 B2 * | 10/2013 | Nichols et al. ................ 710/104 |
| 2002/0120742 A1 * | 8/2002 | Cherry ......................... 709/226 |
| 2003/0002069 A1 * | 1/2003 | Bhogal et al. ................ 358/1.15 |
| 2003/0133146 A1 * | 7/2003 | Parry ........................... 358/1.15 |
| 2003/0147097 A1 * | 8/2003 | Kotani .................... G06K 15/00 |
| | | | 358/1.18 |
| 2004/0156061 A1 * | 8/2004 | Kobayashi .................... 358/1.12 |
| 2004/0176118 A1 | 9/2004 | Strittmatter et al. |
| 2004/0179230 A1 * | 9/2004 | Kitada et al. ................. 358/1.15 |
| 2005/0086282 A1 * | 4/2005 | Anderson et al. ............ 358/1.15 |
| 2005/0105146 A1 * | 5/2005 | Tanaka ......................... 358/498 |
| 2007/0002349 A1 * | 1/2007 | Hwang et al. ................ 358/1.13 |

(Continued)

FOREIGN PATENT DOCUMENTS

JP         2006209308 A  *  8/2006
WO    WO 2011/090474 A1    7/2011

*Primary Examiner* — Kimberly A Williams
(74) *Attorney, Agent, or Firm* — Blakely, Sokoloff, Taylor & Zafman LLP (57) ABSTRACT

The disclosed embodiments provide a system that performs a print job. During operation, the system obtains one or more available media attributes, including a media size, a border size, and/or a media type, from a printer associated with the print job. Next, the system provides the available media attributes to an application and uses the application to automatically generate and format print data for the print job based on the available media attributes. Finally, the system sends the print job to the printer, where the print job is executed using the printer.

18 Claims, 4 Drawing Sheets

(56) References Cited

U.S. PATENT DOCUMENTS

| | | | |
|---|---|---|---|
| 2007/0124436 A1* | 5/2007 | Shepherd | 709/223 |
| 2008/0080003 A1* | 4/2008 | Ferlitsch et al. | 358/1.16 |
| 2009/0002770 A1* | 1/2009 | Cavill et al. | 358/402 |
| 2009/0021776 A1* | 1/2009 | Dolan et al. | 358/1.15 |
| 2009/0245818 A1* | 10/2009 | Miyazaki | 399/16 |
| 2010/0188680 A1* | 7/2010 | Xiao | 358/1.13 |
| 2011/0267640 A1* | 11/2011 | Takahashi | 358/1.15 |
| 2012/0075646 A1* | 3/2012 | Koike | 358/1.9 |
| 2012/0262753 A1 | 10/2012 | Viccari et al. | |
| 2014/0009776 A1* | 1/2014 | Suzuki | G06K 15/1807 358/1.13 |
| 2014/0368867 A1* | 12/2014 | Kim et al. | 358/1.15 |
| 2015/0002573 A1* | 1/2015 | Kitahara | B41J 11/008 347/16 |
| 2015/0002862 A1* | 1/2015 | Maeda | B41J 11/0095 358/1.2 |

* cited by examiner

AUTOMATIC GENERATION OF PRINT DATA FOR PRINT JOBS BASED ON AVAILABLE MEDIA ATTRIBUTES

RELATED APPLICATION

This application hereby claims priority under 35 U.S.C. §119 to U.S. Provisional Application No. 61/493,500, entitled "Automatic Generation of Print Data for Print Jobs Based on Available Media Attributes," by Howard A. Miller, Richard Blanchard Jr. and Todd W. Ritland, filed 5 Jun. 2011.

BACKGROUND

1. Field

The present embodiments relate to printers for computer systems. More specifically, the present embodiments relate to techniques for automatically generating and formatting print data for print jobs based on available media attributes from printers associated with the print jobs.

2. Related Art

Printing may facilitate a variety of personal and/or business activities. For example, documents may be printed within a business for design, marketing, accounting, review, record-keeping, planning, and/or notification purposes. Similarly, a user may print pictures and/or greeting cards for display and/or sharing with friends, family, and/or acquaintances.

However, different types of print settings and/or printer capabilities may be required to produce optimal print output for various types of digital media. For example, a word-processing document may be printed on a laser printer in black-and-white to enhance the readability and/or sharpness of text in the word-processing document. On the other hand, the resolution and/or color gamut of a color photo may be emphasized by printing the color photo on glossy paper using a dye-sublimation printer.

Hence, what is needed is a mechanism for using print settings and/or printer capabilities to enhance print output for various types of digital media.

SUMMARY

The disclosed embodiments provide a system that performs a print job. During operation, the system obtains one or more available media attributes, including a media size, a border size, and/or a media type, from a printer associated with the print job. Next, the system provides the available media attributes to an application and uses the application to automatically generate and format print data for the print job based on the available media attributes. Finally, the system sends the print job to the printer, where the print job is executed using the printer.

In some embodiments, the system also uses the application to obtain, for the print job, a media selection comprising a subset of the available media attributes, wherein the print job is executed on media corresponding to the media selection.

In some embodiments, the media selection is based on at least one of a user of the application, a content type associated with the print job, and a regional setting such as a language setting and/or a location.

In some embodiments, using the application to automatically generate and format print data for the print job based on the available media attributes involves at least one of:
  (i) wrapping the print data;
  (ii) scaling the print data;
  (iii) filtering the print data; and
  (iv) adjusting one or more color attributes of the print data.

In some embodiments, the print data is associated with at least one of a webpage, an email, unformatted text, contact information, a map, an image, and an ad.

In some embodiments, the print data is generated by the application after the print job is requested.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for performing a print job. The print job may include print data and/or one or more job options associated with the print data. The print job may be created by a print server and/or other device with functionality to communicate with a printer. After the print job is created, the print server may send the print job to the printer, and the printer may execute the print job by outputting the print data onto sheets of paper according to the job options in the print job.

More specifically, the disclosed embodiments provide a method and system for automatically configuring the print job based on available media attributes from a printer associated with the print job. The available media attributes may include a media size, border size, and/or media type. In other words, the available media attributes may identify the media currently loaded in the printer. The available media attributes may additionally be obtained by querying the printer for the media sizes, border sizes, and/or media types that are currently available in the printer.

The available media attributes may then be provided to an application and used by the application to automatically generate and format print data for the print job. For example, the application may facilitate printing of the print data on the media by wrapping the print data, scaling the print data, filtering the print data, and/or adjusting one or more color attributes of the print data based on the available media attributes. After the print data is generated, the print job may be sent to the printer, where the print job is executed by the printer.

The application may also provide a media selection of a subset of the available media attributes for use with the print job if the available media attributes include multiple sets of media sizes, border sizes, and/or media types for media in the printer. The media selection may be based on a user of the application; a content type that specifies the type of digital media (e.g., image, text, data) to be printed using the print job; and/or a regional setting (e.g., language setting, location) associated with the application, an associated operating system, and/or an associated device. For example, the available media attributes may specify a first media with a 4×6 media size, borderless printing, and glossy media type, as well as a second media with a letter media size, bordered printing, and a matte media type. Because the first media may be better suited for images and the second media may be better suited for text, the application may make a media selection of the first media for print jobs containing image-based print data and a media selection of the second media for print jobs containing text-based print data. The printer may then execute the print job on media corresponding to the media selection.

Figure 1:
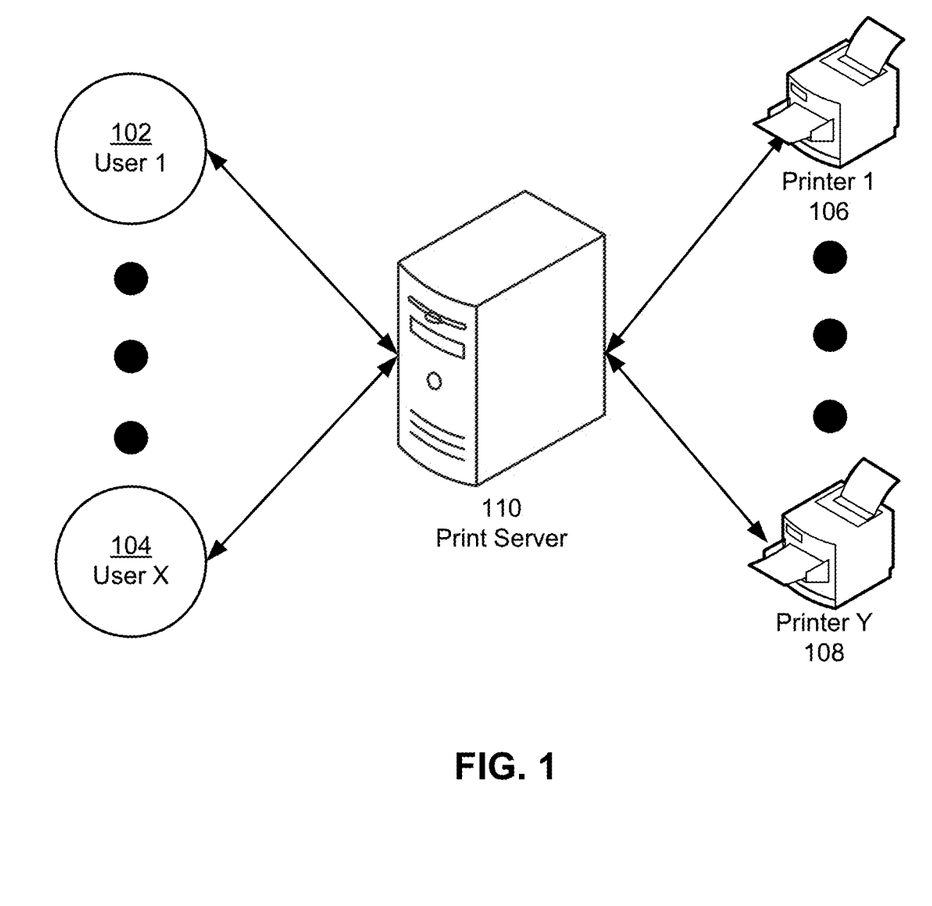
FIG. 1 shows a printing system in accordance with an embodiment.

FIG. 1 shows a printing system in accordance with an embodiment. As shown in FIG. 1, the printing system includes a print server 110 and one or more printers (e.g., printer 1 106, printer y 108) connected to print server 110. The printers may correspond to network printers that are connected to print server 110 using a wired or wireless network connection. Alternatively, one or more printers may connect to print server 110 and/or other print servers in the printing system as local peripherals using one or more printer cables and/or one or more ports (e.g., parallel ports, serial ports, Universal Serial Bus (USB) ports).

Print server 110 may process and configure requests for print jobs from one or more users (e.g., user 1 102, user x 104). The users may be associated with access rights to one or more printers connected to print server 110. For example, the users may be associated with user accounts that enable use of one or more printers connected to print server 110.

Upon receiving a request for a print job, print server 110 may send the request to the appropriate printer, which executes the print job using settings provided by the user requesting the print job. For example, the user may select a file to be printed and one or more job options associated with printing the file. The job options may include a number of copies, a number of printing sides (e.g., single- or double-sided), collation, stapling, hole punching, an ink set (e.g., black-and-white, color), a toner, a dye, a ribbon, a media size (e.g., A4, letter), a border size (e.g., bordered, borderless), a media type (e.g., glossy, matte, bond, colored), a paper tray, an output bin, a resolution and/or print quality (e.g., low, medium, high), a page orientation, and/or a printing range (e.g., page range, selection).

Alternatively, configuration of job options and/or print jobs may be performed by the printing system and/or an application associated with the print job. As discussed in further detail with respect to FIG. 2, the printing system may obtain one or more available media attributes from the printer associated with the print job. The available media attributes may include one or more media sizes, one or more border sizes, and/or one or more media types. In other words, the available media attributes may correspond to the properties of media (e.g., paper) currently available in the printer.

Next, the printing system may provide the available media attributes to the application, and the application may automatically generate and format print data for the print job based on the available media attributes. For example, the application may wrap the print data, scale the print data, filter the print data, and/or adjust one or more color attributes of the print data based on a specified media size, border size, and/or media type from the available media attributes.

Moreover, the application may provide a media selection of a subset of the available media attributes to the printing system for execution of the print job on media corresponding to the media selection. For example, the application may specify a specific media size, border size, and/or media type to be used with the print job if multiple media sizes, border sizes, and/or media types are available in the printer. In addition, the media selection may be based on a user (e.g., user 1 102, user x 104) of the application; a content type that specifies the type of digital media (e.g., image, text, data) to be printed using the print job; and/or a regional setting (e.g., language setting, location) associated with the application, an associated operating system, and/or an associated device. For example, the application may make a media selection of a small media size, borderless printing, and/or glossy media type from the available media attributes if the content type associated with the print job includes an image. On the other hand, the application may make a different media selection of a large media size, bordered printing, and/or matte media type from the available media attributes if the content type associated with the print job includes unformatted text.

Finally, the printing system may send the print job to the printer. For example, the printing system may provide the print data and/or one or more job options associated with the print data to the printer. The print job may then be executed using the printer. Consequently, the application and/or printing system may facilitate printing for the user by configuring the print job using information obtained across the printing workflow, from the print data provided by the application to the media on which the print job is executed.

Figure 2:
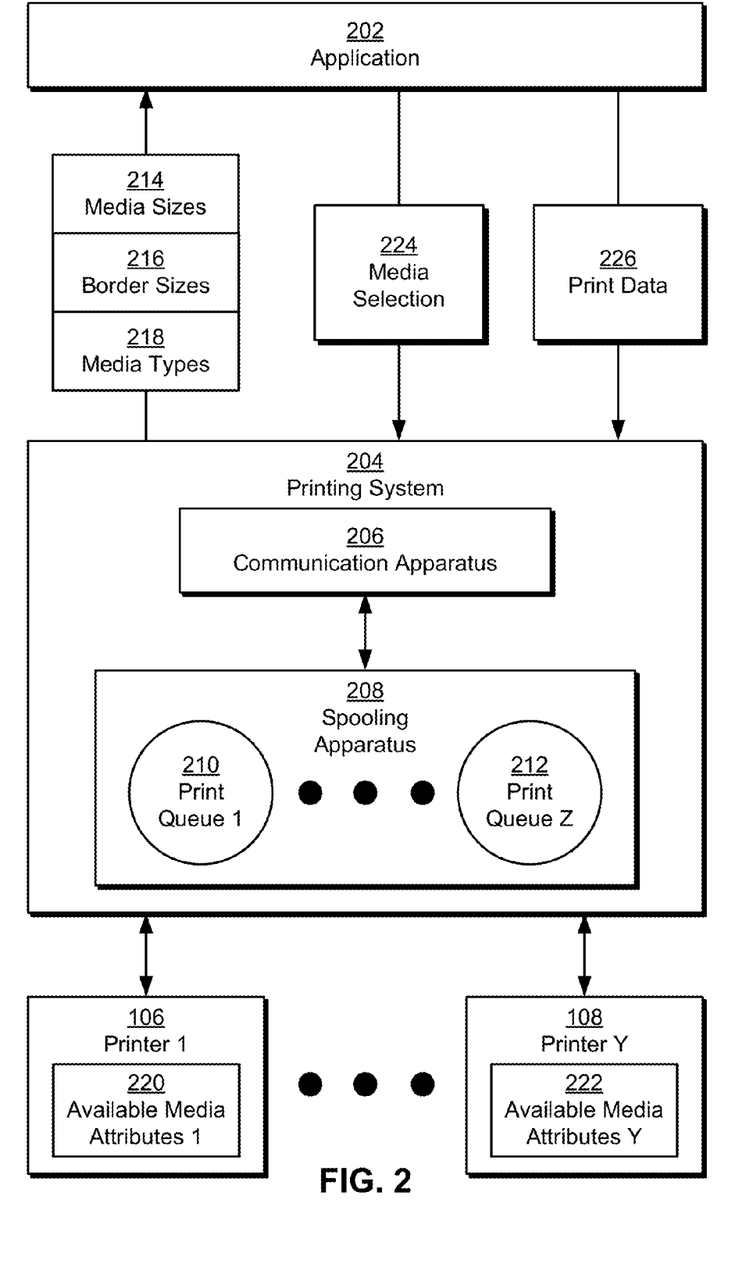
FIG. 2 shows a system for performing a print job in accordance with an embodiment.

FIG. 2 shows a system for performing a print job in accordance with an embodiment. As described above, the system includes an application 202, a printing system 204, and/or other components (e.g., computer systems, print servers) associated with printing system 204. Note that printing system 204 generally includes all printing-related code that resides outside of application 202, including code within a print server (e.g., print server 110 of FIG. 1) and code within a device on which application 202 executes.

In addition, application 202 may be configured to communicate with printing system 204. For example, application 202 may execute on a laptop computer, personal computer, mobile phone, tablet computer, and/or other network-enabled electronic device. In turn, application 202 may communicate with printing system 204 using HyperText Transfer Protocol (HTTP), Internet Printing Protocol (IPP), Line Printer Daemon (LPD) protocol, and/or another network protocol associated with communication in printing system 204.

In particular, application 202 and printing system 204 may enable the printing of digital media. For example, application 202 may provide a user interface (e.g., graphical user interface (GUI)) that allows a user to select text, images, and/or other files to be included in a print job. Alternatively, application 202 may perform batch-processing operations that create and schedule print jobs in the printing system with little to no user intervention.

After a print job is created, application 202 may send the print job to printing system 204, where the print job is placed into a print queue (e.g., print queue 1 210, print queue z 212) by a spooling apparatus 208. For example, spooling apparatus 208 may assign the print job to a specific printer (e.g., printer 1 106, printer y 108) by placing the print job in the print queue for the printer. When printing system 204 subsequently determines that the printer is not busy, printing system 204 may send the print job to the printer. Alternatively, spooling apparatus 208 may place the print job into a print queue for a printing pool containing multiple physical printers. Once printing system 204 sees that a printer in the printing pool meeting certain criteria is available, printing system 204 may send the print job to the printer. Note the printer can be selected from the printing pool based on the load, availability, available media attributes (e.g., available media attributes 1 220, available media attributes y 222), and/or other characteristics of printers in the printing pool.

In one or more embodiments, application 202 enables the printing of non-printing-specific data and/or multimedia. For example, application 202 may correspond to a web browser, email client, plain-text editor, address-book application, and/or other type of software program that allows the user to view and/or print webpages, emails, unformatted text, contact information, maps, images, and/or ads. Such lack of printing-based formatting in the data may cause the data to be printed non-optimally and/or differently across print jobs. For example, the user may attempt to use an email client to print an image attached in an email. However, instead of printing the image on glossy photo paper, the email client may print both the image and the accompanying text on matte letter paper. Furthermore, the appearance and/or arrangement of the printed image and accompanying text may vary from printer to printer.

In one or more embodiments, the system of FIG. 2 facilitates printing for the user by automatically configuring print jobs across the printing workflow from application 202 to the printer. For each print job, a communication apparatus 206 in printing system 204 may obtain one or more available media attributes (e.g., available media attributes 1 220, available media attributes y 222) from a printer associated with the print job. As mentioned above, the printer may be selected by the user, application 202, and/or printing system 204 to execute the print job based on one or more characteristics of the printer.

The available media attributes may include a media size, a border size, and/or a media type. In particular, each distinct media (e.g., type of paper) in the printer may be uniquely identified by a set of available media attributes containing a media size, border size, and media type. For example, a printer containing three distinct media may provide nine total available media attributes grouped into three sets of three available media attributes. The first set of available media attributes may identify the first media with a 5×7 media size, a 0-inch border size (e.g., borderless printing), and a glossy media type. The second set of available media attributes may identify the second media with an 8½×11 media size, a ½-inch border size, and a matte media type. The third set of available media attributes may identify the third media with an 8½×11 media size, a ½-inch border size, and a bond media type.

Next, communication apparatus 206 may provide the available media attributes to application 202 as one or more media sizes 214, border sizes 216, and media types 218. Application 202 may then automatically generate and format print data 226 for the print job based on the available media attributes. For example, application 202 may correspond to a web browser that formats a webpage using dimensions based on one or more media sizes 214 and/or border sizes 216 and saves the formatted webpage to a Portable Document Format (PDF) file.

More specifically, if only one distinct media is identified by the available media attributes (e.g., media sizes 214, border sizes 216, and media types 218 each contain one element), application 202 may configure print data 226 for use with the identified media. On the other hand, if multiple distinct media are specified by media sizes 214, border sizes 216, and media types 218, application 202 may provide a media selection 224 of a subset of the available attributes to printing system 204 for execution of the print job on media corresponding to media selection 224. For example, application 202 may make media selection 224 by specifying the media size, border size, and media type of a media loaded in the printer to enable use of the media with the print job.

In one or more embodiments, media selection 224 is based on the user of application 202, a content type associated with the print job, and/or a regional setting. First, application 202 may obtain media selection 224 from the user. For example, application 202 may show a drop-down menu that allows the user to select from some or all of the available media attributes for use with the print job. Alternatively, application 202 may make media selection 224 based on the content type of the digital media (e.g., image, text, data) to be printed using the print job. For example, application 202 may select a larger media size and/or matte media type for use with text-based digital media, a smaller media size and/or glossy media type for use with image-based digital media, and an address label media type for use with digital media containing physical addresses.

Furthermore, media selection 224 may be influenced by a regional setting that provides location-based information related to application 202, an associated operating system, an associated device, and/or the print job. The regional setting may include a language setting for the user interface of application 202 and/or a location of an associated device, as provided by a user of application 202 and/or a positioning system (e.g., Global Positioning System) associated with the device on which application 202 executes. For example, application 202 may include a media size of 8½×11 in media selection 224 if the regional setting specifies a location and/or language setting associated with North America and to A4 otherwise.

During generation and/or formatting of print data 226 based on the available media attributes, application 202 may wrap and/or scale print data 226. For example, application 202 may truncate lines of text from an email so that the text is printed within the dimensions and/or borders of the media used with the print job. Similarly, application 202 may scale an image up or down to fit the image within the dimensions of the media.

Application 202 may also filter print data 226. For example, application 202 may remove text from an email if the email contains an attached image and a glossy media type is used with a print job containing the email. Along the same lines, application 202 may remove ads from a webpage if a small media size is used with a print job containing the webpage. Moreover, application 202 may include only addresses from contact information if an address label media type is used with a print job containing the contact information.

Finally, application 202 may adjust one or more color attributes of print data 226. For example, application 202 may increase the lightness of a black background in print data 226 if a transparency media type is used with the print job.

Once print data 226 is generated by application 202, printing system 204 may send print data 226 and one or more job options for the print job to the printer (e.g., through spooling apparatus 208) to enable execution of the print job by the printer. Furthermore, application 202 and/or printing system 204 may save print data 226 and/or the job option(s) for subsequent use with other print jobs to maintain continuity in the formatting and/or appearance of print output associated with print data 226 across different printers.

As a result, application 202 and printing system 204 may utilize information across the printing workflow to enhance the print output of the print job. Moreover, such enhancement may occur after the print job is requested through application 202 (e.g., by the user). In other words, the system of FIG. 2 may improve print output by providing information that facilitates both an appropriate media selection 224 for the print job and the generation of print data 226 that is optimized for the media corresponding to media selection 224.

Those skilled in the art will appreciate that the system of FIG. 2 may be implemented in a variety of ways. For example, components of application 202 and printing system 204 may reside on the same device (e.g., computer system, electronic device, etc.), or components of application 202 and printing system 204 may execute on different devices and communicate over a network connection. Similarly, communication apparatus 206 and spooling apparatus 208 may be implemented by the same component and/or different components in printing system 204. In addition, application 202 may include functionality to communicate with multiple print servers to enable the processing of print jobs by different sets of printers connected to the print servers.

Figure 3:
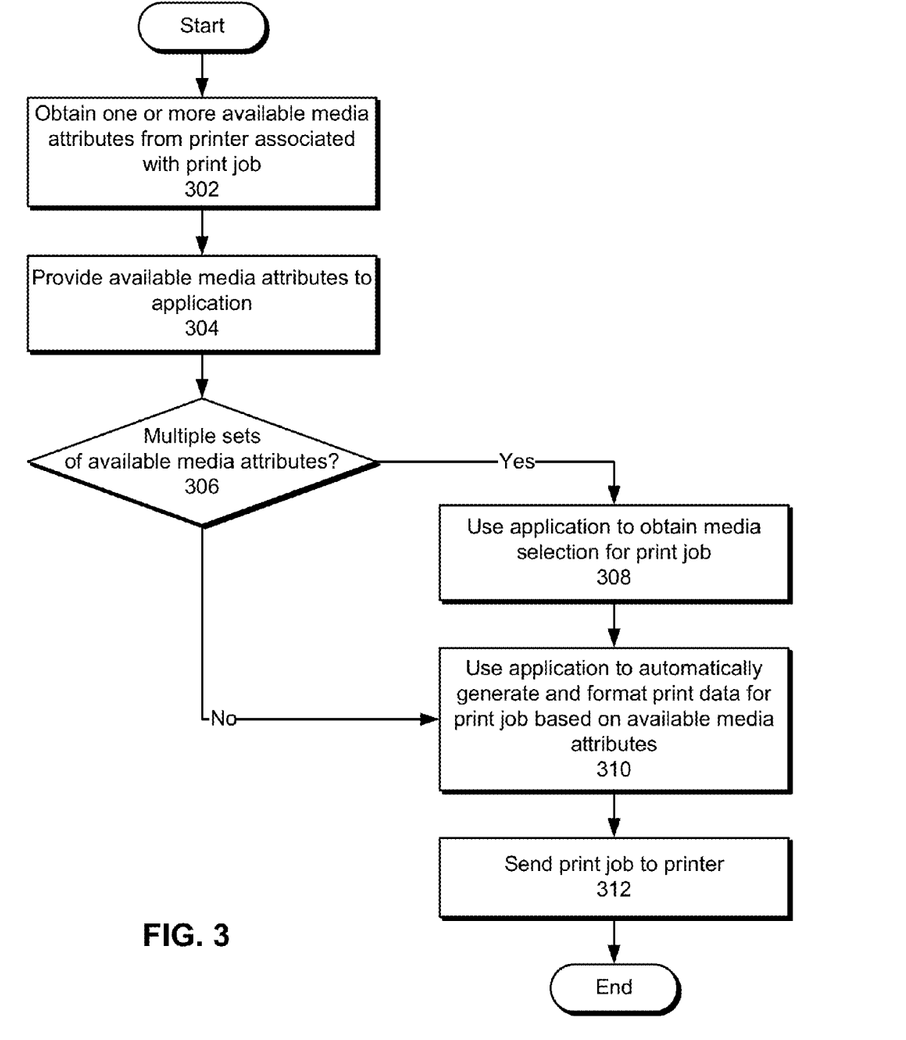
FIG. 3 shows a flowchart illustrating the process of performing a print job in accordance with an embodiment.

FIG. 3 shows a flowchart illustrating the process of performing a print job in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

Initially, one or more available media attributes are obtained from a printer associated with the print job (operation 302). The available media attributes may include a media size, a border size, and/or a media type. Next, the available media attributes are provided to an application (operation 304). For example, the available media attributes may be provided to a web browser, email client, plain-text editor, address-book application, and/or other application through which a request for the print job was made by a user.

The presence of multiple sets of available media attributes (operation 306) may influence the configuring of the print job by the application. If multiple sets of available media attributes are provided to the application, the application may be used to obtain a media selection for the print job (operation 308). The media selection may include a subset of the available media attributes that uniquely identifies a media to be used with the print job. For example, the media selection may specify a media with a specific media size, border size, and media type for use with the print job. In addition, the media selection may be based on a user of the application, a content type associated with the print job, and/or a regional setting such as a location and/or language setting. If only one set of available media attributes is provided to the application, no media selection is obtained from the application because the media size, border size, and media type of media in the printer cannot be configured by the application.

The application may then be used to automatically generate and format print data for the print job based on the available media attributes (operation 310). For example, the application may wrap the print data, scale the print data, filter the print data, and/or adjust one or more color attributes of the print data to optimize printing of the print data on media to be used with the print job. Finally, the print job is sent to the printer (operation 312) for execution of the print job. For example, the print job may be placed in a print queue for the printer to be subsequently sent to the printer once the printer is ready to start the print job.

Figure 4:
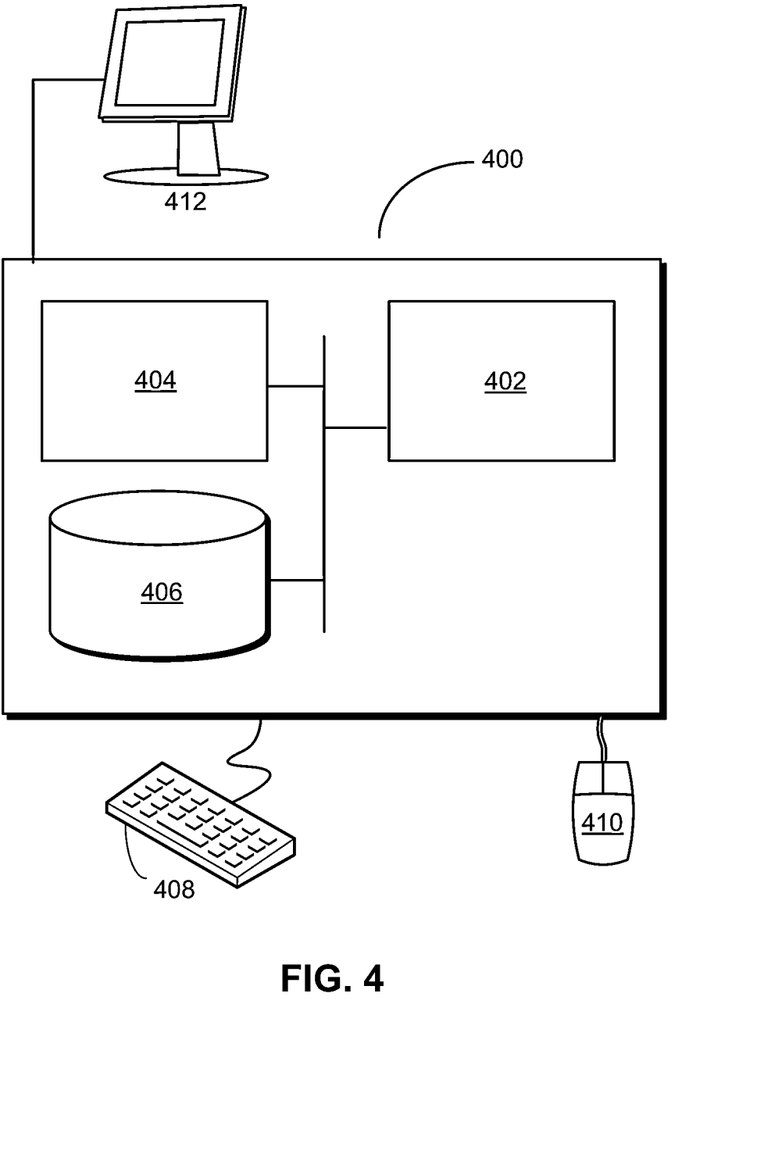
FIG. 4 shows a computer system in accordance with an embodiment.

FIG. 4 shows a computer system 400 in accordance with an embodiment. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for performing a print job. The system may include a communication apparatus, an application, and a spooling apparatus. The communication apparatus may obtain one or more available media attributes from a printer associated with the print job, including one or more media sizes, border sizes, and/or media types. The communication apparatus may also provide the available media attributes to the application, where print data for the print job is automatically generated and formatted based on the available media attributes. The application may also obtain a media selection containing a subset of the available media attributes to enable execution of the print job on media corresponding to the media selection. Finally, the spooling apparatus may send the print job to the printer, where the print job is executed using the printer.

In addition, one or more components of computer system 400 may be remotely located and connected to the other components over a network. Portions of the present embodiments (e.g., communication apparatus, spooling apparatus, application, etc.) may also be located on different nodes of a distributed system that implements the embodiments. For example, the present embodiments may be implemented using a cloud computing system that manages the use of a set of remote printers by a set of users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for performing a print job, comprising:
   obtaining, by an application executing on a processor, one or more available media attributes for a printer associated with the print job, wherein the available media attributes comprise at least one of a media size, a border size, and a media type;
   selecting, by the application, a media selection based on information provided by a positioning system coupled to the processor, the media selection comprising a subset of the available media attributes;
   receiving, by the application, print data for the print job, the print data having one or more properties that cause the print data to be printed differently for two or more different print jobs; and
   changing, by the application, the print data by changing the one or more properties of the print data based on the available media attributes for the media selection,
   wherein the print job is executed using the printer to print the changed print data, and wherein the print job is executed on media corresponding to the media selection.

2. The computer-implemented method of claim 1, wherein the media selection is based on at least one of:
   a user of the application;
   a content type associated with the print job; and
   a regional setting.

3. The computer-implemented method of claim 2, wherein the regional setting is at least one of a language setting and a location corresponding to the information provided by the positioning system.

4. The computer-implemented method of claim 1, wherein changing, by the application, one or more properties of the print data based on the available media attributes involves at least one of:
   wrapping the print data;
   scaling the print data;
   filtering the print data; and
   adjusting one or more color attributes of the print data.

5. The computer-implemented method of claim 1, wherein the print data is associated with at least one of a webpage, an email, unformatted text, contact information, a map, an image, and an ad.

6. The computer-implemented method of claim 1, wherein the print data is generated by the application after the print job is requested.

7. A system comprising:
   a processor coupled to a memory through a bus, the memory storing instructions for an application;
   a communication interface coupled to the processor through the bus and configured to obtain one or more available media attributes from a printer associated with a print job, wherein the available media attributes comprise at least one of a media size, a border size, and a media type; and
   a positioning system coupled to the processor thorough the bus and configured to provide information to the application,
   the application configured to:
      select, for the print job, a media selection based on the information provided by the positioning system, the media selection comprising a subset of the available media attributes;
      receive print data for the print job, the print data having one or more properties that cause the print data to be printed differently for two or more different print jobs; and
      change the print data by changing the one or more properties of the print data based on the available media attributes for the media selection,
      wherein the print job is executed using the printer to print the changed print data, and wherein the print job is executed on media corresponding to the media selection.

8. The system of claim 7, wherein the media selection is based on at least one of:
   a user of the application;
   a content type associated with the print job; and
   a regional setting.

9. The system of claim 8, wherein the regional setting is at least one of a language setting and a location corresponding to the information provided by the positioning device.

10. The system of claim 7, wherein changing, by the application, one or more properties of the print data based on the available media attributes involves at least one of:
    wrapping the print data;
    scaling the print data;
    filtering the print data; and
    adjusting one or more color attributes of the print data.

11. The system of claim 7, wherein the print data is associated with at least one of a webpage, an email, unformatted text, contact information, a map, an image, and an ad.

12. The system of claim 7, wherein the print data is generated by the application after the print job is requested.

13. A non-transitory computer-readable storage medium storing instructions that when executed by a processor cause the processor to perform a method for performing a print job, the method comprising:
    obtaining, by an application executing on the processor, one or more available media attributes for a printer associated with the print job, wherein the available media attributes comprise at least one of a media size, a border size, and a media type;
    selecting, by the application, a media selection based on information provided by a positioning system coupled to the processor, the media selection comprising a subset of the available media attributes;
    receiving, by the application, print data for the print job, the print data having one or more properties that cause the print data to be printed differently for two or more different print jobs; and
    changing, by the application, the print data by changing the one or more properties of the print data based on the available media attributes for the media selection,
    wherein the print job is executed using the printer to print the changed print data, and wherein the print job is executed on media corresponding to the media selection.

14. The computer-readable storage medium of claim 13, wherein the media selection is based on at least one of:
    a user of the application;
    a content type associated with the print job; and
    a regional setting.

15. The computer-readable storage medium of claim 14, wherein the regional setting is at least one of a language setting and a location corresponding to the information provided by the positioning system.

16. The computer-readable storage medium of claim 13, wherein changing, by the application, one or more properties of the print data based on the available media attributes involves at least one of:
- wrapping the print data;
- scaling the print data;
- filtering the print data; and
- adjusting one or more color attributes of the print data.

17. The computer-readable storage medium of claim 13, wherein the print data is associated with at least one of a webpage, an email, unformatted text, contact information, a map, an image, and an ad.

18. The computer-readable storage medium of claim 13, wherein the print data is generated by the application after the print job is requested.

* * * * *